US007822726B1

(12) United States Patent
Cardin (10) Patent No.: US 7,822,726 B1
(45) Date of Patent: Oct. 26, 2010

(54) ENCAPSULATION OF STORAGE OBJECT EXTENSIBILITY RECORDS FOR BACKUP AND RESTORE

(75) Inventor: Dale Cardin, San Luis Obispo, CA (US)

(73) Assignee: Symantec Operating Corporation, Mountain View, CA (US)

( * ) Notice: Subject to any disclaimer, the term of this patent is extended or adjusted under 35 U.S.C. 154(b) by 325 days.

(21) Appl. No.: 11/190,610

(22) Filed: Jul. 27, 2005

Related U.S. Application Data

(60) Provisional application No. 60/674,224, filed on Apr. 22, 2005.

(51) Int. Cl.
*G06F 17/30* (2006.01)
(52) U.S. Cl. ........................................ 707/702
(58) Field of Classification Search ................ None
See application file for complete search history.

(56) References Cited

U.S. PATENT DOCUMENTS

| 5,931,935 | A * | 8/1999 | Cabrera et al. ............. 710/260 |
| 6,321,219 | B1 * | 11/2001 | Gainer et al. ................. 707/3 |
| 6,389,433 | B1 * | 5/2002 | Bolosky et al. ............. 707/205 |
| 6,513,051 | B1 * | 1/2003 | Bolosky et al. ............. 707/204 |
| 2004/0220982 | A1 * | 11/2004 | Probert et al. ............... 707/205 |
| 2005/0246386 | A1 * | 11/2005 | Sullivan et al. ............. 707/200 |
| 2006/0004868 | A1 * | 1/2006 | Claudatos et al. ........ 707/104.1 |
| 2006/0184652 | A1 * | 8/2006 | Teodosiu et al. ............ 709/221 |

OTHER PUBLICATIONS

"VERITAS NetBackup: Release Notes for UNIX and Windows," 2004, Veritas Software Corporation, pp. 1-122.*
Boyce, Jim, "Understanding the Windows 2000 Distributed File System," Jan. 15, 2001, TechRepublic: A ZDNet Tech Community, pp. 1-7.*
"Inside Win2K NTFS, Part 1"; Windows 2000 Magazine, Microsoft Corporation, 2002, http://msdn2.microsoft.com/en-us/library/ms995846(d=printer).aspx.

* cited by examiner

*Primary Examiner*—Neveen Abel Jalil
*Assistant Examiner*—Farhan M Syed
(74) *Attorney, Agent, or Firm*—Rory D. Rankin; Meyertons, Hood, Kivlin, Kowert & Goetzel, P.C.

(57) ABSTRACT

A method for encapsulation of extensibility records for backup and restore comprises determining whether a storage object to be backed up, such as a file or a directory of a primary data set, has an extensibility record associated with it. In response to determining that the storage object has an associated extensibility record, the method may include storing an encoding of at least a portion of the extensibility record, and generating a backup version of the storage object.

11 Claims, 8 Drawing Sheets

ENCAPSULATION OF STORAGE OBJECT EXTENSIBILITY RECORDS FOR BACKUP AND RESTORE

This application claims the benefit of U.S. provisional patent application Ser. No. 60/674,224, entitled "Advanced Techniques For Data Protection And Restoration", filed Apr. 22, 2005.

BACKGROUND OF THE INVENTION

1. Field of the Invention

This invention relates to computer systems and, more particularly, to backup and restoration of data within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of factors, such as system crashes, hardware storage device failures, software defects, or user errors (e.g., an inadvertent deletion of a file) may potentially lead to data corruption or to a loss of critical data in such environments. In order to recover from such failures, various kinds of backup techniques may be employed. For example, in some storage environments, file-level replication may be employed, where a complete copy of the set of files in one or more file systems at a primary host may be created at a secondary host. Along with the files, copies of file attributes or metadata (e.g., file size, creation time, etc.) may also be stored in the replica. If the primary host fails, or if the file system at the primary host becomes corrupted or unavailable, the files and their attribute values may be recovered or restored by copying from the replica.

Some modern file systems may implement extensibility features that support enhanced functionality (such as the ability to mount volumes, or to transparently use hierarchical storage for seldom-used files as described below) for certain files or directories, beyond the functionality typically provided for ordinary files and directories. Special file system metadata in the form of extensibility records or attributes may be used to identify the files and directories for which the enhanced functionality is supported, and to store configuration information for the extended functionality. Such extensibility records may traditionally not be handled appropriately (or may be ignored) by backup systems for a variety of reasons.

For example, in some versions of file systems (such as NTFS) supported under Microsoft's Windows™ operating systems, a feature called "reparse points" is provided, which may permit file system redirection or special data interpretation. A number of different types of reparse points may be supported natively by the file system, and it may also be possible for applications to generate new types of reparse points to support application-specific features. Two common uses for reparse points in traditional systems include mount points for volumes and migration tags for files. For example, the file system may indicate that a volume is mounted at a particular location (e.g., a directory path) by associating a reparse point with a directory. When an access is attempted to the contents of the directory, the file system may retrieve the reparse point and determine the physical location of the mounted volume so that I/O to the volume may be performed. In addition, in environments that employ a hierarchical storage management (HSM) system, files that have not been accessed for a long time may be moved to archival storage, and a reparse point may be associated with the file name. If an access to the file is then attempted, the file system may examine the reparse point to look up the actual location of the file within the hierarchical file system, and retrieve the file contents from that location. Typical end-users may be unaware of the existence of reparse points, and the attributes or data structures used by the file system to implement the reparse points may not be visible to end-users using traditional file system navigation tools. Special kernel-level entities such as file system filter drivers may be configured to recognize the existence of the reparse points and to take the appropriate actions (such as loading file data from a hierarchical storage management system's archival storage when the file is accessed) for different applications. Extensibility features similar to reparse points may be supported by a number of file systems and other storage management services used with a variety of operating systems.

Traditional backup techniques, such as making exact replicas, may not work well for storage objects that have such extensibility features enabled. For example, if an HSM system has placed the contents of a file in archival storage and associated a reparse point with the file name, and a conventional replication manager accesses the file for copying, an attempt to read the contents of the file from archival storage may result. Such a retrieval may significantly delay replication, especially for large files, and in some cases users may not even have intended to backup files that have already been archived. Furthermore, the secondary host or replication target may not be configured to support HSM. If the reparse point is recreated at the replica and an attempt to access the replica of the file is made, a lack of adequate HSM support may result in failures or in unpredictable behavior. Similar problems may arise in backing up storage objects with other kinds of extensibility features enabled. One response to these problems in some traditional backup systems has been to avoid backing up objects that have the extensibility features enabled. However, ignoring or avoiding backing up the objects may result in incomplete restoration capabilities: e.g., it may not be possible to fully restore a source set of objects (e.g., files and directories of a file system) to the state they were in prior to the backup if information on the extensibility features is not retained.

SUMMARY

Various embodiments of methods and systems for encapsulation of extensibility records for backup and restore are disclosed. According to one embodiment, a method comprises determining whether a storage object to be backed up, such as a file or a directory of a primary data set, has an extensibility record associated with it. An extensibility record is a data structure that may be associated with a storage object in order to support extended or enhanced functionality (such as the ability to mount volumes on a particular directory, or to transparently use hierarchical storage for seldom-used files) for the storage object. Extensibility records may be implemented using a variety of techniques in different embodiments, e.g., as reparse points associated with files or directories in NTFS file systems, as file or directory attributes, as "soft links" or aliases, etc. In response to determining that the storage object has an associated extensibility record, the method may include storing an encoding of at least a portion of the extensibility record, and generating a backup version of the storage object. The encoding may be associated with, and/or stored with, the backup version of the storage object.

By storing the contents of the extensibility record in encoded form, instead of, for example, replicating the extensibility record in the original format during backup, unwanted and/or unpredictable side effects at a backup storage devices or a secondary host may be avoided. For example, if the extensibility record was originally created to implement migration of rarely-used file data to archival storage from a primary host, replicating the extensibility record at a secondary host (i.e., without encoding the extensibility record) may result in an attempt to locate or interact with a hierarchical storage management system at the secondary host when the backup version of the storage device is accessed. In many storage environments, secondary hosts may not be configured with hierarchical storage management systems, and errors and/or unpredictable behavior may result if the extensibility record is replicated without changes at the backup version of the file. At the same time, by saving the encoding of the extensibility record, e.g., at a non-volatile storage device such as a disk or a tape at a secondary host, extensibility-related configuration information may be protected from failures at the primary data set. In response to a restoration request, in one embodiment the method may include regenerating the original extensibility record from the encoding, and associating the regenerated extensibility record with a restored version of the storage object. That is, all the extensibility-related information stored in the original extensibility record may be restored from the encoding.

In one specific embodiment, the extensibility record may comprise a first reparse point, and the encoding may be included within a second reparse point of a different type than the first reparse point. For example, the first reparse point may include a first tag identifying a "type" or function of the reparse point (e.g., whether the reparse point was generated to support a volume mount point or a hierarchical storage management system), and a first data field that includes configuration details, state information etc. associated with the function to be performed using the first reparse point. In such an embodiment, the method may include generating a second reparse point with a second tag identifying the second reparse point as being of a second type, and associating the second reparse point with the backup version of the storage object. The second reparse point may include a second data field, which may be used to store an encoding of the first tag and/or the first data field. In such an embodiment, the underlying operating system or file system support for extensibility records may also be used for storing an encoded version of the original extensibility record, thus providing an efficient way of preserving the extensibility information for the storage objects of primary data set. In other embodiments, a variety of other techniques may be used to encode the extensibility record, such as by including an encoded version of the extensibility record within an alternate named stream associated with the backup version of a file, storing contents of the extensibility record in a separate database, etc.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
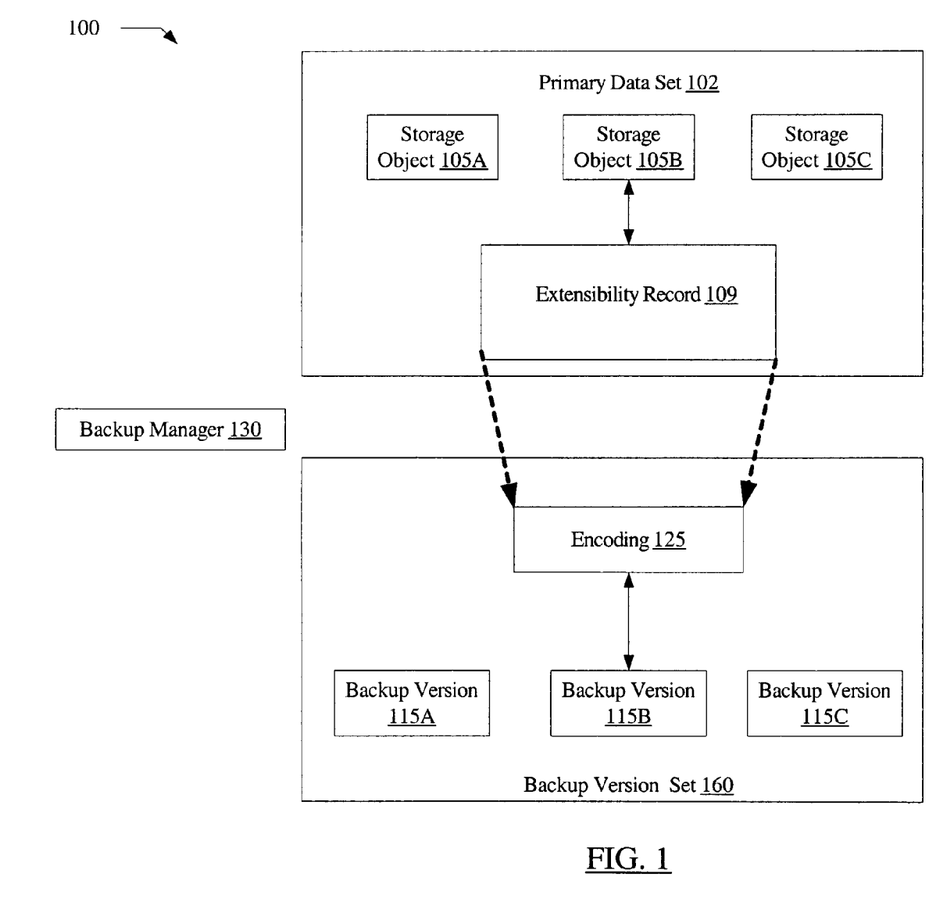
FIG. 1 is a block diagram illustrating one embodiment of a system.

FIG. 1 is a block diagram illustrating a system 100 according to one embodiment. As shown, system 100 includes a backup manager 130 and a plurality of storage objects 105 (e.g., storage objects 105A, 105B and 105C) of a primary data set 102 that are to be backed up. Storage objects 105 may include, for example, files, directories, file systems, logical or physical volumes, etc. in various embodiments. Backup manager 130 may be configured to determine whether a particular storage object 105 has an associated extensibility record 109, for example by invoking a system call supported by an operating system in use at a primary host from which primary data set 102 is accessible. The term "extensibility record", as used herein, refers to a data structure that may be associated with a storage object 105 in order to support extended or enhanced functionality (such as the ability to mount volumes on a particular directory, or to transparently move data of seldom-used files to and from hierarchical storage) for the storage object, e.g., functionality that may not typically be shared by all the storage objects within a given data set. Special kernel-level entities such as file system filter drivers may be configured to recognize the existence of extensibility records 109 within a primary data set 102 and to take the appropriate actions (such as automatically loading file data from a hierarchical storage management system's archival storage when the file is accessed) for different applications. (It is noted that even though extensibility records may typically be associated with a subset of storage objects in a given storage environment, it is possible for all the storage objects in a given primary data set 102 to have associated extensibility records 109 in some embodiments.) Further details and examples of extensibility features that may be supported using extensibility records in various embodiments are provided below. Extensibility records 109 may be implemented using a variety of techniques in different embodiments; for example, in embodiments where a version of the NT File System (NTFS) is employed, extensibility records may be implemented as structures or attributes called "reparse points" associated with files or directories, while in other embodiments employing various UNIX-based file systems, extensibility records may be implemented via "soft links" or aliases to other storage objects.

If backup manager 130 identifies a storage object (such as storage object 105B in the embodiment depicted in FIG. 1) with an associated extensibility record, backup manager 130 may be configured to generate and store an encoding 125 of the extensibility record 109. For example, backup manager 130 may incorporate at least a portion of the information included within the extensibility record 109 into a data structure with a different format from the original extensibility record. In addition, backup manager 130 may be configured to generate a backup version set 160 including backup versions of the storage objects 105, such as backup version 115A corresponding to storage object 105A, backup version 115B corresponding to storage object 105B, backup version 115C corresponding to storage object 105C, etc. Thus, unlike some conventional backup managers, backup manager 130 may generate backup versions of primary storage objects that have associated extensibility records (in addition to generating encodings of the extensibility records themselves), as well as backup versions of those primary storage objects that do not have associated extensibility records, thus providing a more complete level of data protection than the conventional backup managers. Backup versions 115 and encodings 125 may be stored at one or more secondary storage devices accessible from a secondary host in some embodiments. The backup version 115B of the storage object 105B that had the associated extensibility record 109 may be associated with the encoding 125 using any of a variety of techniques, as described below in further detail. For example, in one embodiment where extensibility record 109 is implemented using a reparse point of a particular type, the encoding 109 may be implemented as a data field within a reparse point of a different type.

By encapsulating the contents of extensibility record 109 in an encoding 125 using a different format or a different data organization as described above, backup manager 130 may help to accomplish a number of different objectives in some embodiments. For example, such an encapsulation may ensure that accesses to the backup version 115B do not activate the same kind of "side effects" that accompany accesses to the primary storage object 105B—e.g., if an access to the primary storage object 105B leads to an automated retrieval of the underlying data from a hierarchical storage archive at a primary host, an access to the backup version 115B may not lead to a corresponding attempt to access a hierarchical storage archive at a secondary host, which may not be set up to support hierarchical storage management in some embodiments. At the same time, the encapsulation of the extensibility record 109 into the encoding 125 ensures that the information included in the extensibility record is not lost or ignored during backup, and can therefore be fully restored (e.g., by decoding the encoding 125) when needed, e.g., in response to a failure at a primary host or a primary host's storage devices. In addition, in some embodiments, the recognition of an extensibility record 109 prior to a generation of a backup version 115 for a storage object 105 may eliminate unnecessary and potentially erroneous operations at the primary data set 102. For example, in some such embodiments, users may want to have storage objects 105 that include user-generated updates to be backed up, but may not want the contents of CD-ROMs, DVD-ROMs, etc. that happen to be mounted on one of the storage objects 105 to be backed up. If an extensibility record 109 indicates that storage object 105C has a CD-ROM drive mounted on it, backup manager 130 may be configured not to open the CD-ROM and unnecessarily attempt to back up all of its contents. It is noted that in some embodiments, users may be provided the option of deciding whether the contents of mounted volumes (as indicated by extensibility records 109) are to be backed up or not.

The term "storage object", as used herein, may refer to any collection of one or more data items for which backup and restore functionality may be desired, such as one or more individual files, file systems, directories (which may also be termed "folders"), logical volumes, database entities such as tablespaces, tables or indexes, etc. In one embodiment, primary data set 102 may be stored at a first or primary computer host, and backup version set 160 may be stored at a secondary computer host linked to the first host via a network. In another embodiment, primary data set 102 and backup version set 160 may be stored within the same host. Various components of backup manager 130 (e.g., a replicator, a snapshot generator, or a restoration engine) may be incorporated within the first and second hosts, as described below in further detail. Backup version set 160 associated with primary data set 102 may be generated and/or maintained using any of a variety of backup techniques in different embodiments, such as various types of replication (e.g., synchronous or asynchronous replication), snapshot or frozen image creation techniques. The primary storage objects 105 as well as their backup versions 115 may be stored on any suitable physical storage devices, such as individual disks, disk arrays, storage appliances, intelligent disk arrays, tape-based devices, and the like in various embodiments. Primary data set 102 may be accessible from a primary host either directly (e.g., via a protocol such as SCSI (Small Computer Serial Interface)) or via a network such as an IP (Internet Protocol) based network, a fibre channel link, etc. Similarly, backup version set 160 may be accessible from a secondary host either directly or via a network. In some embodiments, portions of storage objects 105 may be backed up directly from volatile storage at the primary host, e.g., without requiring backup manager 130 to access disk or tape storage at the primary host. In some embodiments, the backup versions 115 may be made accessible to end-users: for example, end-users may directly access the backup versions 115, and/or restore storage objects 105 from their respective backup versions 115, without the help of backup administrators.

Figure 2A:
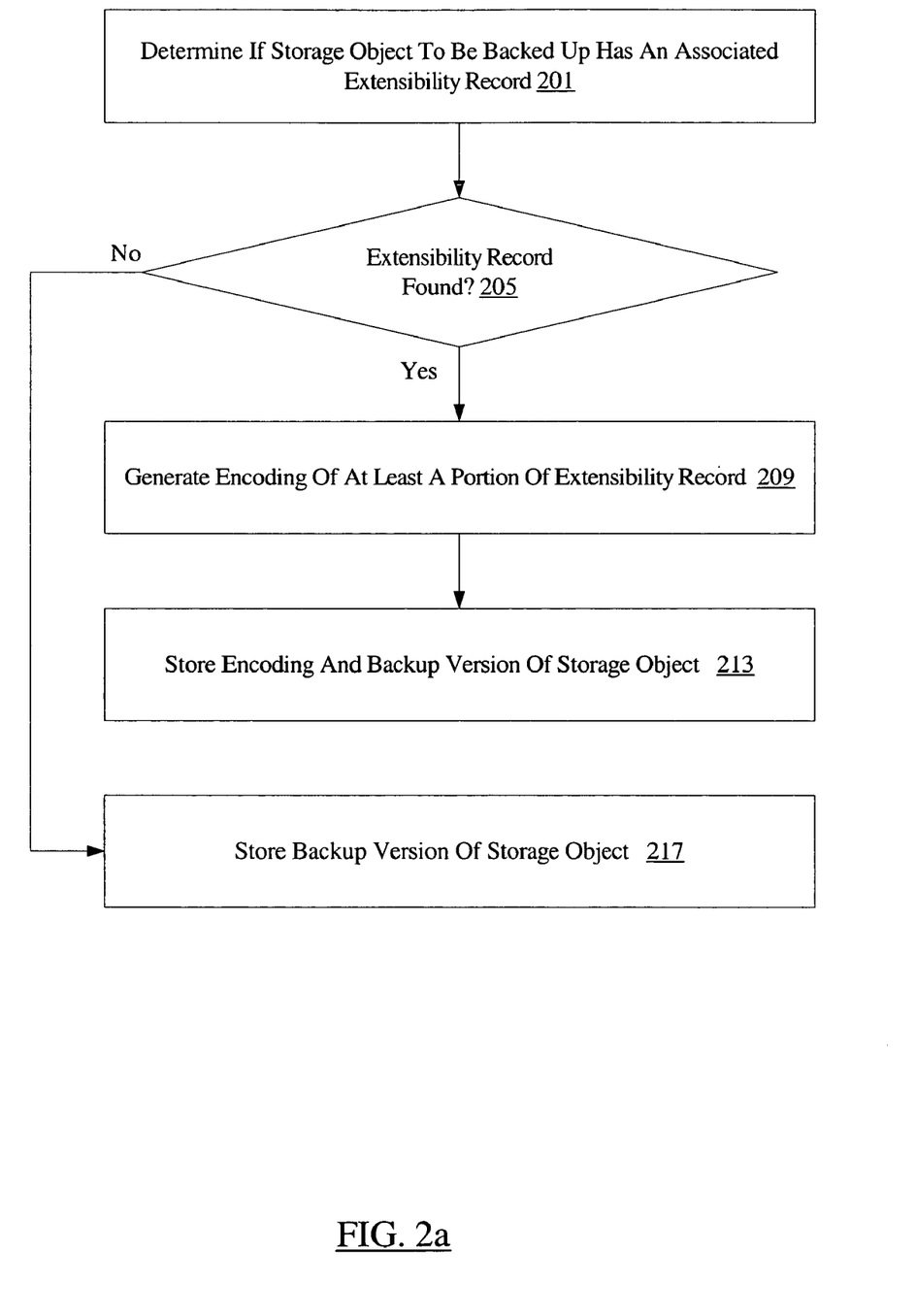
FIG. 2a is a flow diagram illustrating aspects of the operation of a backup manager during backup operations according to one embodiment.

FIG. 2a is a flow diagram illustrating aspects of the operation of backup manager 130 during backup operations according to one embodiment. Backup manager 130 may be configured to initiate backup operations in response to a variety of triggers in various embodiments—e.g., in response to an explicit backup request, based on a schedule, in response to changes detected at primary data set 102, etc. As shown in block 201 of FIG. 2a, backup manager 130 may be configured to determine whether a storage object 105 to be backed up has an associated extensibility record 109. If an associated extensibility record 109 is found for the storage object (as determined in decision block 205), backup manager 130 may be configured to generate an encoding 125 of at least a portion of the extensibility record 109 (block 209), and store the encoding and a backup version 115 of the storage object (block 213). An implicit or explicit indication of an association between the backup version 115 and the encoding 125 may also be stored by backup manager 130 in some embodiments—e.g., the encoding may be stored as an attribute of the backup version, as an extensibility record of a different type than the original extensibility record, as a separate record in a database pointed to by the backup version, etc. If no extensibility record 109 is found (as also determined in decision block 205), backup manager 130 may be configured to store a backup version 115 without any associated encoding 125 (block 217).

Figure 2B:
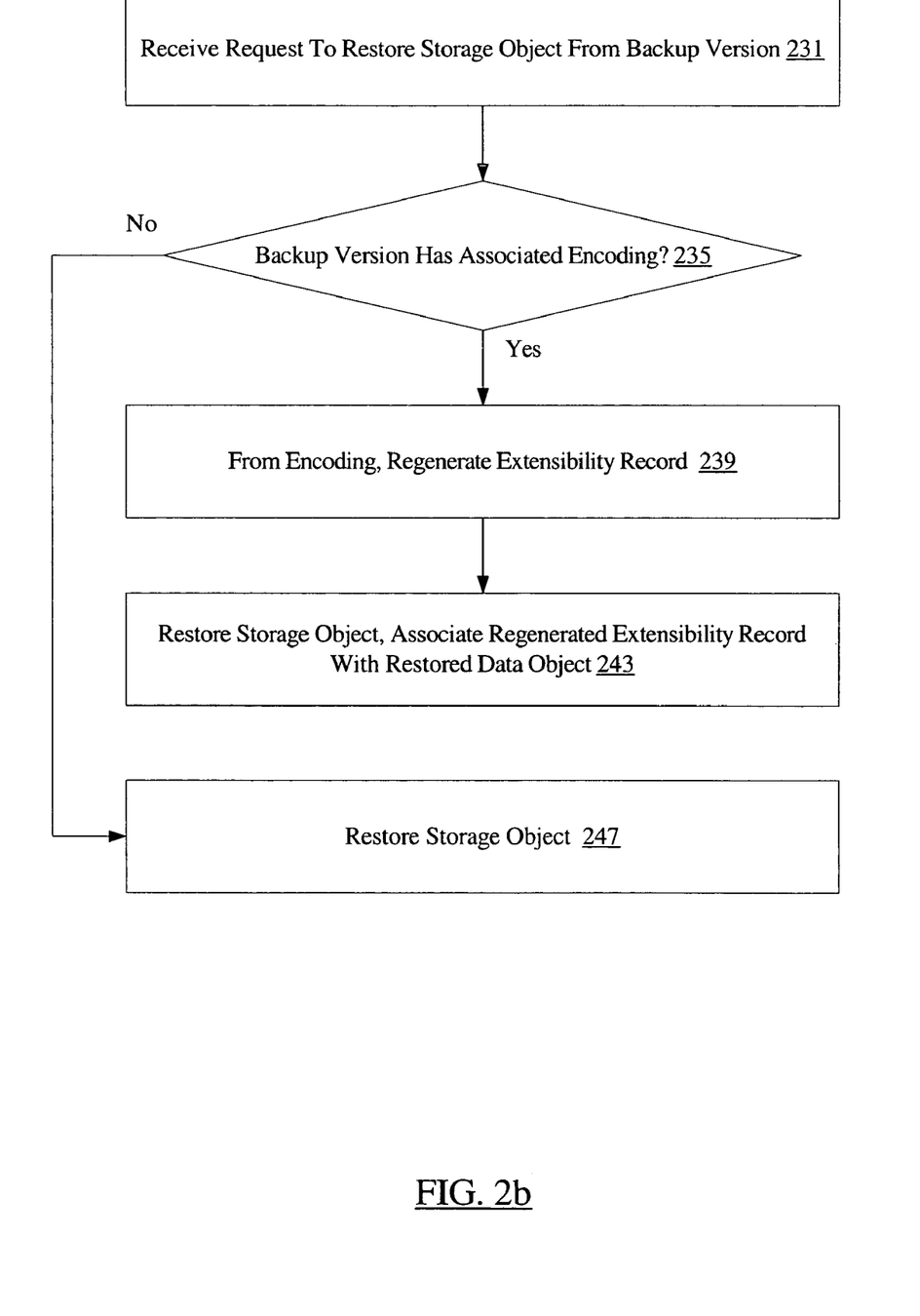
FIG. 2b is a flow diagram illustrating aspects of the operation of a backup manager during restore operations according to one embodiment.

FIG. 2b is a flow diagram illustrating aspects of the operation of backup manager 130 during restore operations according to one embodiment. In response to a request to restore a storage object 105 from a backup version 115 (as shown in block 231 of FIG. 2b), backup manager 130 may be configured to determine whether the backup version 115 has an associated encoding 125 of an extensibility record 109. As noted earlier, the encoding 125 may for example be stored as an attribute of the backup version, or included within an extensibility record of a different type than the original extensibility record 109. Backup manager 130 may be configured to determine whether an encoding exists, and/or to access the encoding, via one or more system calls in some embodiments. If an associated encoding is found (as detected in decision block 235), backup manager 130 may be configured to regenerate the extensibility record 109 from the encoding (block 239), to restore the storage object from the backup version and associate the regenerated extensibility record with the restored storage object (block 243). If no encoding is found (as also detected in decision block 235), backup manager 130 may be configured to restore the storage object 105 (block 247) without an associated extensibility record.

Figure 3:
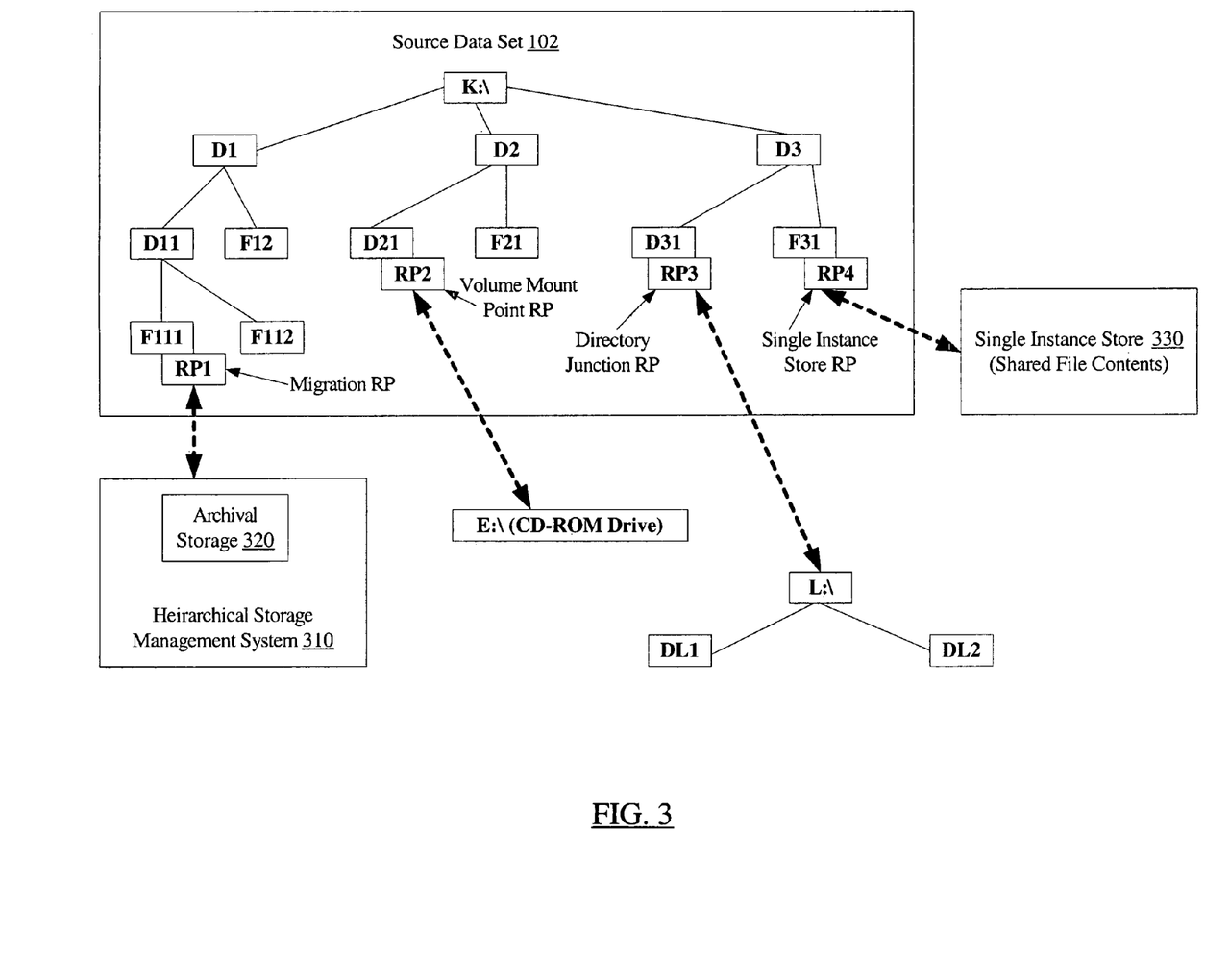
FIG. 3 is a block diagram an exemplary primary data set including various storage objects with associated reparse points, according to one embodiment.

In some embodiments, extensibility records 109 may be implemented as "reparse points" defined and used in accordance with extensibility features supported by an operating system and/or a file system. FIG. 3 is a block diagram illustrating an exemplary primary data set 102 including various storage objects with associated reparse points, according to one embodiment. In the depicted embodiment, primary data set 102 includes a hierarchy of files and directories rooted under a root directory ("K:\"). That is, source storage objects 105 include files and directories in the example shown in FIG. 3. Non-root directories (e.g., D1, D2, D21, etc.) are indicated by the initial letter "D" in their names in FIG. 3, files (e.g., F12, F111, etc.) are indicated by the initial letter "F", and reparse points associated with files or directories are indicated by the initial letters "RP". Four exemplary reparse points are illustrated in FIG. 3: a migration reparse point RP1 associated with file 111, a volume mount point RP2 associated with directory D21, a directory junction RP3 associated with directory D31, and a single instance store RP4 associated with file F31. In general, a reparse point may be implemented as an application-generated data structure associated with a file or a directory. The data structure may, in some implementations, include two fields: a type field or "tag" indicating the specific function for which the reparse point is to be used by the application (e.g., hierarchical storage management, volume mount, etc.), and a data field or "data packet" that includes application-specific data, such as state information, access methods to use to obtain the underlying data, etc.

The operating system in use at the host where the reparse points are generated (e.g., a version of a Windows™ operating system from Microsoft Corporation) may impose no specific rules about the internal format of the reparse point data structure in one embodiment, as long as the generating application and/or a specified file system filter driver can recognize the reparse point and perform the appropriate actions as needed. In some embodiments, the operating system may enforce uniqueness of reparse point tag names—i.e., the operating system may ensure that different applications do not generate conflicting reparse point tags—and/or may impose certain other restrictions such as limiting the maximum number of reparse points that may be associated with a file or directory, or the maximum amount of data that can be stored in the data field of a given reparse point. When the file system (e.g., NTFS) in use for K:\ is about to open a file or a folder with an associated reparse point, it reads the unique reparse point tag name and passes the raw data of the data packet to a file system filter driver registered to process that tag. The file system filter driver then performs the application-appropriate actions. The file system filter driver may be a layer of software on top of a file system driver within a storage software stack. The file system filter driver may be configured to intercept operations to be performed on storage objects as the operations are passed down the stack (or as operation results are passed up the stack), and to perform any of a variety of operations (e.g., redirect read/write requests, leave data or I/O requests unchanged, perform extra tasks such as establishing contact with a hierarchical storage manager or a single instance store manager, etc.) on the intercepted operations or operation results.

For example, file F111 may not have been accessed for a period of time, and at least a portion of its data may have been migrated (e.g., in accordance with an automated migration policy) to archival storage 320 of a hierarchical storage management (HSM) system 310. The HSM and/or the file system managing the K:\ directory hierarchy may have generated the migration reparse point RP1 associated with file F111. RP1 may include a type field or tag indicating that the data has been migrated by an HSM system, and a data field or packet identifying, for example, HSM 310, a location of the contents of file F111 within archival storage 320, configuration information indicating the set of operations to be performed to retrieve the data, state information such as when the data was migrated, etc. When F111 is accessed by a user at the primary host, the file system filter driver may be configured to use the data packet of RP1 to activate the HSM and retrieve the migrated data. The type field and/or the data field of a reparse point may be application-specific in some embodiments in that while they may be interpreted correctly by the application that originally generated the reparse point and/or by its associated file system filter drivers, or by a set of applications designated to cooperate with the generating application, the type field and/or data field may not necessarily be understood or correctly interpreted by other applications.

A volume mount point reparse point RP2 may be associated with directory D21 in FIG. 3 when CD-ROM drive E:\ is mounted on, or made accessible from, directory D21. When an application or a user accesses directory D21 at a primary host, the file system and/or volume manager may be configured to use a tag or type field of RP2 to determine that a removable media drive has been mounted on D21, and to use the data packet or field of RP2 to identify the specific CD-ROM drive, the commands to be used to access or "open" a CD-ROM that may have been inserted into the drive, etc. A directory junction RP, such as RP3 associated with directory D31 in FIG. 3, may include a tag that indicates that the corresponding directory represents an alternate path, soft link, or alias to another directory, and a data packet that identifies the other directory (e.g., directory "E:\" in the example shown in FIG. 3). Thus, when a user accesses directory D31 and requests a listing or display of its contents, the contents of the underlying directory (e.g., subdirectories DL1 and DL2 of directory E:\) may be listed or shown. Both volume mount point reparse points and directory junction reparse points may be considered to support indirect access to underlying storage by providing an alternate path or alias to the underlying storage, e.g., by making it appear to a user or an application as though contents of a CD-ROM drive (e.g., E:\) or one directory hierarchy (e.g., the directory hierarchy rooted at L:\) were located in a second directory hierarchy (e.g., the directory hierarchy rooted at K:\). A single instance store (SIS) reparse point, such as RP4 shown associated with file F31 in FIG. 3, may include within its data packet an identification of a single instance store 330 where shared contents of file F31 (i.e., data of file F31 that may be common to one or more other files and may therefore be stored in a shared location to reduce overall storage utilization) are stored. The tag of an SIS reparse point such as RP4 may be generated by an SIS application to identify the file as a participant in SIS, and the data packet may be used to retrieve the portions of the file from the SIS when that portion of the file is accessed. In addition to HSM, volume mounting, directory junctions and SIS, reparse points may be defined and used for a variety of other purposes by various applications in different embodiments. As described below, a new type of reparse point (i.e., a reparse point with a tag or type field defined by backup manager 130) may be used to store encodings 125 in some embodiments.

Figure 4:
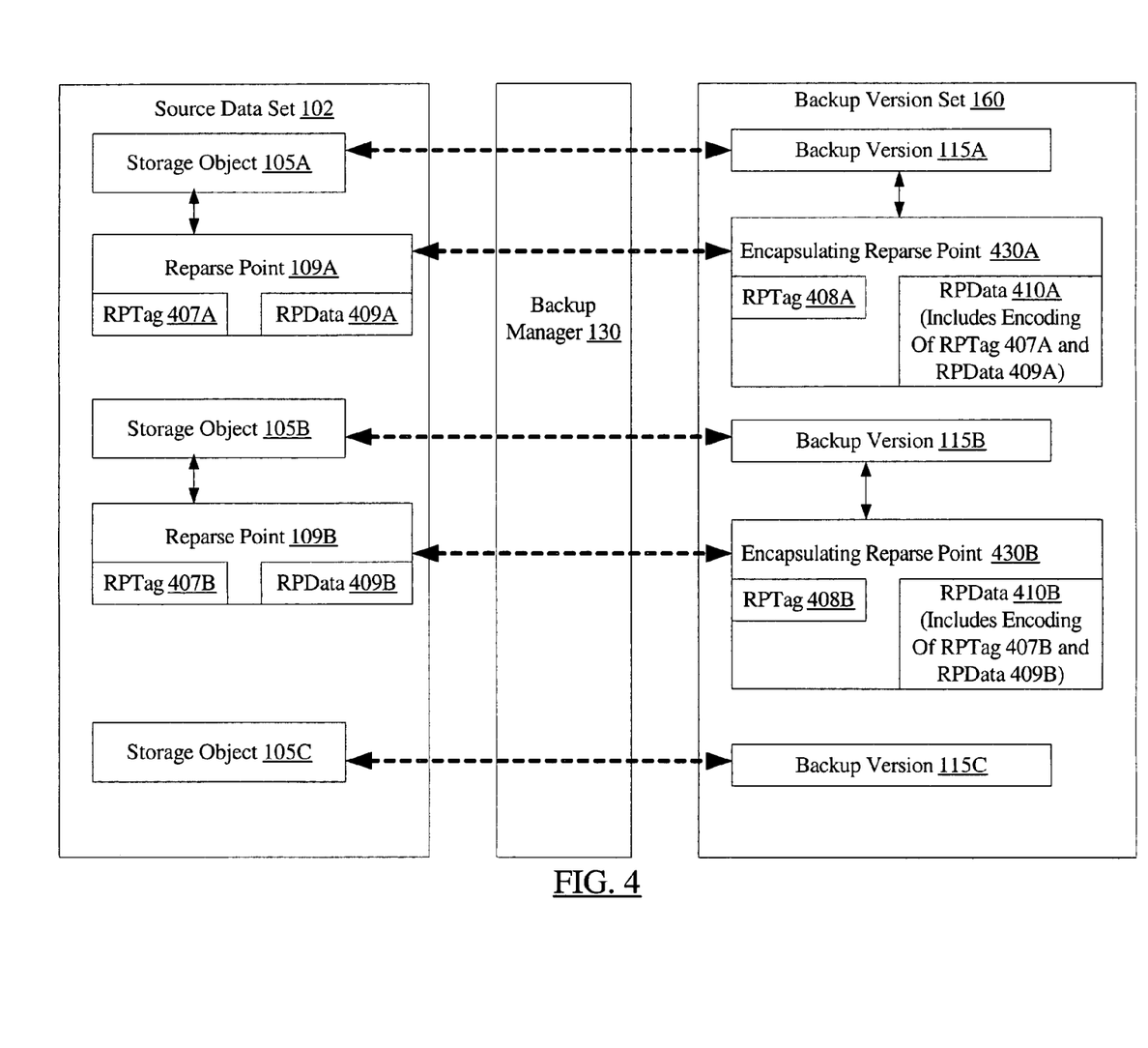
FIG. 4 is a block diagram illustrating an embodiment where a backup manager is configured to encapsulate reparse points associated with primary storage objects within reparse points of a different type for backup and restore.

FIG. 4 is a block diagram illustrating an embodiment where backup manager 130 is configured to encapsulate reparse points associated with primary storage objects within reparse points of a different type for backup and restore. As shown, primary data set 102 may include storage object 105A with an associated reparse point 109A, storage object 105B with associated reparse point 109B, and storage object 105C with no associated reparse point. Reparse point 109A may include reparse point tag (RPTag) 407A and reparse point data (RPData) field 409A, and reparse point 109B may include RPTag 407B and RPData 409B. Backup manager 130 may be configured to determine whether each storage object 105 has an associated reparse point 109. For example, in some embodiments, backup manager 130 may be given a path to a root storage object (such as directory K:\ of FIG. 3) and requested to backup of all the storage objects contained within a storage hierarchy rooted at the root storage object. In response to the backup request, backup manager 130 may recursively traverse the root storage object and all of its child storage objects.

In an embodiment where the storage objects to be backed up include directories and files, backup manager 130 may be configured to identify the contents of a particular directory using system calls such as findFirstFile(directoryName, findData) followed by iterative invocations of findNextFile(directoryName,findData) or their equivalents. The system calls findFirstFile and findNextFile may respectively return the name of a first file or subdirectory contained within the named directory, and the names of other files or subdirectories contained within the directory, along with attribute information for the file or subdirectory. The attribute information may be included within the findData parameter or data structure (whose contents may be populated by the operating system) in one implementation. The findData structure may indicate that the file or subdirectory has a reparse point associated with it, for example if a fileAttributes field of the findData data structure is set to a particular value by the operating system (e.g., to a constant value defined as FILE_ATTRIBUTE_REPARSE_POINT). If a file or directory is identified as having an associated reparse point, the tag and/or data fields of the reparse point may be obtained and/or manipulated by invoking one or more additional system calls, such as a DeviceIOControl( ) call, a getFileAttribute( ) or getFileAttributes( ) call, a setFileAttribute( ) call, etc. The tag and data fields of reparse points may be extracted from a reparse point data structure using different system calls (e.g., getReparsePointTag( ) and getReparsePointData( )) in some embodiments. In one embodiment, only a single system call may be needed to determine whether a particular storage object has an extensibility record associated with it, and to obtain the details of the extensibility record or records if they exist. For example, a system call such as getExtensibilityRecords(storageObjectID, numExtensibilityRecordsFound, extensibilityRecordArray) may be provided in some embodiments, where the operating system populates the parameter numExtensibilityRecordsFound with the number of extensibility records associated with a storage object identified by storageObjectID, and the extensibilityRecordArray parameter is populated with the contents of the extensibility records if any are found. Various other system call interfaces or other techniques may be employed to determine whether a particular file or directory has an associated extensibility record or reparse point in different embodiments.

In the embodiment depicted in FIG. 4, when backup manager 130 identifies a particular storage object 105 as having an associated reparse point 109, the backup manager may be configured to generate an encapsulating reparse point 430 to include the encoding of the original reparse point. The encapsulating reparse point 430 may include an RPTag 408 generated by or on behalf of backup manager 130; that is, the RPTag 408 of the encapsulating reparse point 430 may differ from the RPTag 407 of the original reparse point 409, and may be understood only by backup manager 130, one or more file system filter drivers and/or a set of applications designated by backup manager 130. An encoding of the original RPTag 407 and RPData 409 of the original reparse point 109 may be included within the RPData 410 of the encapsulating reparse point. The encoding may be implemented using any desired technique in different embodiments: e.g., the original tag and data fields may be stored using an encryption algorithm or a compression algorithm, formatted as a concatenated string (e.g., with a separator string between a string version of RPTag 407 and a string version of RPData 409), or simply by including a copy of the original reparse point within the RPData 410, etc. By using the same underlying support for extensibility features as was used for the original extensibility records, backup manager 130 may efficiently protect the original extensibility configuration information of the primary data set, for example using a few system calls to generate the encoding for each extensibility record.

In some embodiments, backup manager 130 may be configured to use a common reparse point tag 408 for all the original reparse points 109 that it encapsulates. In other embodiments, different reparse point tags 408 may be generated corresponding to different source reparse point tags 407. For example, in one implementation, backup manager 130 may be configured to generate a particular reparse point tag such as "BackupOfHSM" to encapsulate HSM reparse points, and a different reparse point tag "BackupOfMountPoint" to encapsulate volume mount point reparse points. For those storage objects, such as 105C, that do not have associated reparse points, backup manager 130 may be configured to generate backup versions without any encapsulating reparse points.

In some embodiments, backup manager 130 may be configurable to perform different types of backup operations for different types of source reparse points, or to avoid encapsulating specified types or instances of reparse points. E.g., in one embodiment, a user may want to exclude mount points entirely from backup version set 160, so backup manager 130 may be configured to ignore volume mount point reparse points during backup, and only generate encapsulating reparse points for other types of primary storage objects that have associated reparse points. In another embodiment, users may be permitted to specify special backup and/or extensibility record encapsulation operations for one or more source storage objects identified by name, and default encapsulation operations may be performed for other source storage objects. Not all the contents of the extensibility record may be encoded within encodings 125 in some embodiments: for example, in embodiments where multiple extensibility records of a primary data set share some common configuration information, a single encoding of the common configuration information may be stored at a secondary host, and pointers to the encoding of the common information may be stored within the encodings associated with individual backup versions.

Figure 5:
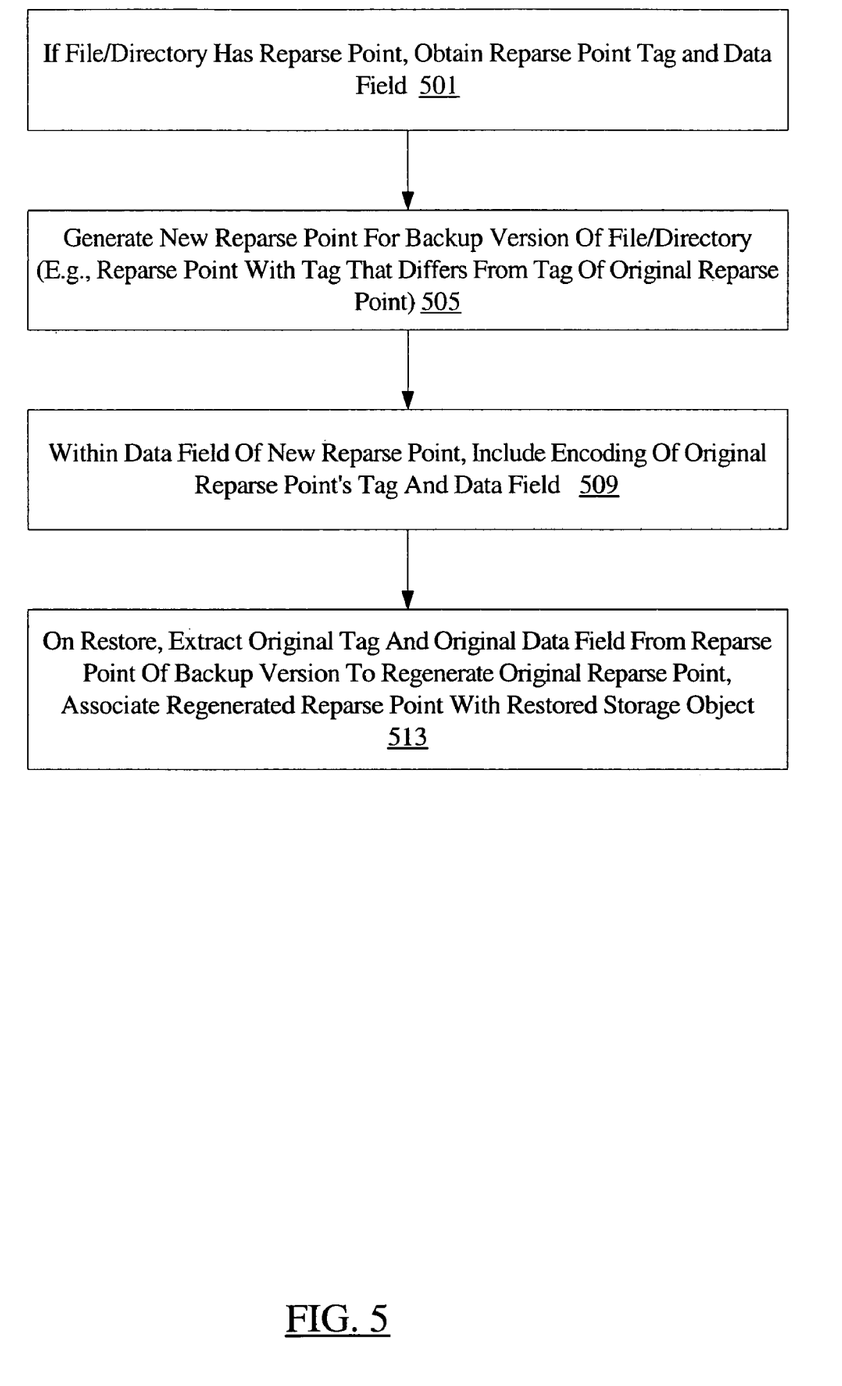
FIG. 5 is a flow diagram illustrating aspects of the operation of a backup manager in an embodiment where extensibility records are implemented as reparse points and encapsulated within other reparse points for backup.

FIG. 5 is a flow diagram illustrating aspects of the operation of backup manager 130 in an embodiment where extensibility records are implemented as reparse points and encapsulated within other reparse points for backup. As shown in block 501 of FIG. 5, if a storage object such as a file or directory to backed up has an associated reparse point, backup manager 130 may be configured to extract the tag and data fields (RPTag 407 and RPData 409, respectively, as shown in FIG. 4) of the reparse point. Backup manager 130 may then be configured to generate a new reparse point to be associated with the backup version of the file or directory—i.e., a reparse point 408 with a new tag, different from the tag of the original reparse point (block 505 of FIG. 5). Within the data field of the new reparse point (e.g. within an RPData 410 field of FIG. 4), backup manager may include an encoding of the original reparse point's tag and data fields (block 509). When/if the file or directory is to be restored, backup manager 130 may regenerate the original reparse point from the encoding, and associate the regenerated reparse point with a restored version of the file or directory (block 513).

In some embodiments, other techniques may be utilized to store encodings of extensibility records. For example, certain operating systems may allow the creation of alternate "streams" which may also be termed "marker streams" associated with a file. A first stream associated with the file may include the data of the file, and an alternate stream, which may sometimes be hidden from users during normal operations, may include any desired metadata for the file, such as an encoding 125 of an extensibility record. In one specific implementation, for example, an application programming interface (API) or system call provided by the operating system (such as a createFile filename, alternateStreamName) system call or a createFileMarker (fileName, alternateStreamName) system call) may allow the generation of such an alternate stream for an existing file. Backup manager 130 may be configured to generate an alternate stream for a backup version of a file, e.g., with a globally unique stream identifier selected by the backup manager, and store an encoding of the extensibility record within the alternate stream. In another embodiment, encodings 125 may be stored within a separate database (i.e., a database separate from backup version set 160), and a pointer to the encoding may be stored with the backup version 115 of the corresponding storage object, e.g., within an attribute, a new reparse point, or an alternate stream of the backup version. A combination of encoding techniques may be used in some embodiments: for example, alternate streams may be used for some extensibility records, and encapsulating reparse points for other extensibility records. In other embodiments, the extensibility records of the primary data objects may be implemented using data structures other then reparse points, while the encodings of the reparse points may be implemented using reparse points. In one embodiment, in addition to storing encodings of extensibility records using one of the techniques described above, backup manager 130 may be configured to store indicators of an absence of extensibility records with the backup versions of storage objects that do not have associated extensibility records. It is noted that while several of the examples provided above have been associated with extensibility features supported by Windows™-based file systems for files and directories, techniques similar to those described above may also be used for storage objects other than files and directories, and for file systems and other storage management layers supported by other operating systems such as various versions of Solaris™ from Sun Microsystems, etc.

Figure 6:
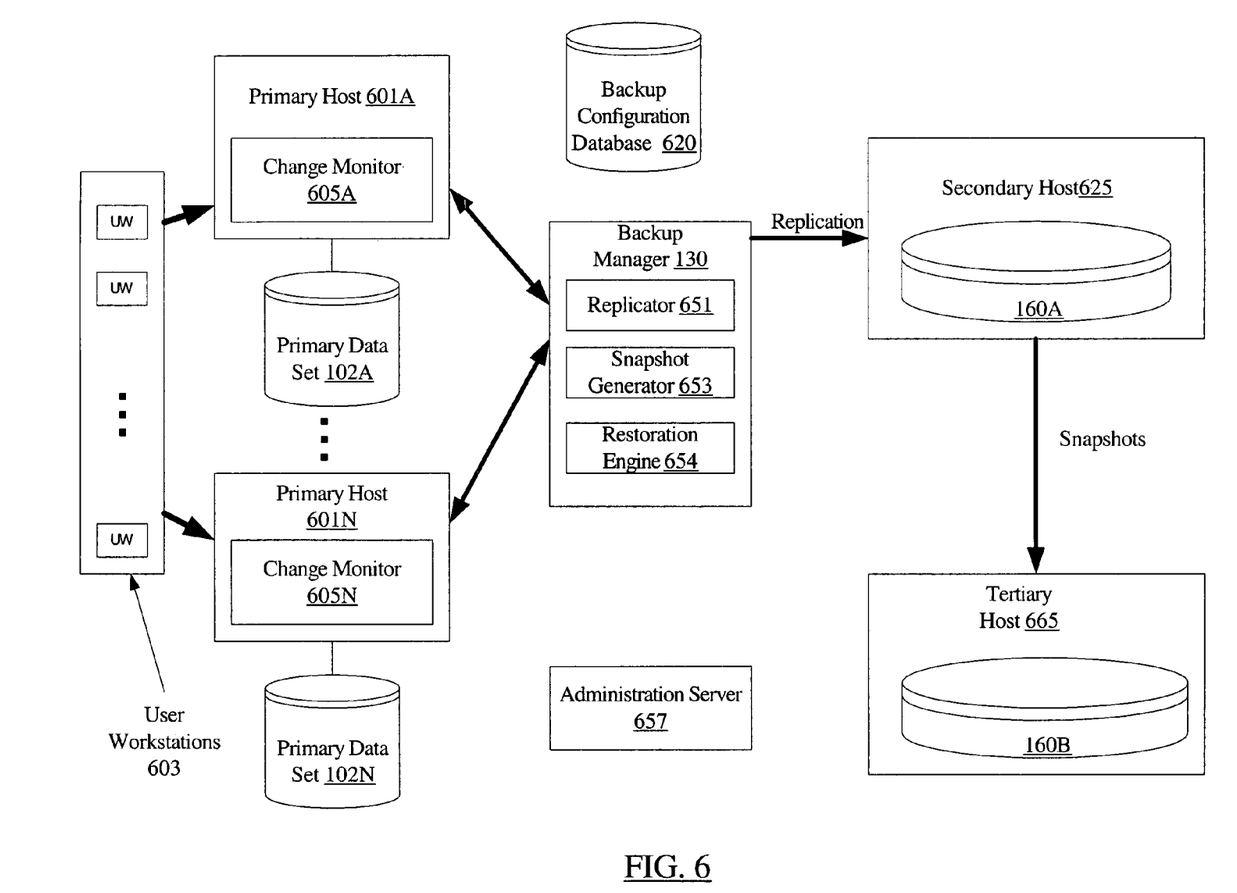
FIG. 6 is a block diagram illustrating an embodiment where data objects of which backup versions are created are generated by replicating primary data objects at a secondary host, according to one embodiment.

FIG. 6 is a block diagram illustrating an embodiment where the backup versions 115 are generated by replicating primary storage objects at a secondary host 625, according to one embodiment. As shown, primary hosts 601A-601N may each include a respective primary data set 102—e.g., primary host 601A may include primary data set 102A, primary host 601N may include primary data set 102N, etc. The primary data sets 102 may represent data of various applications being executed, for example, on behalf of a plurality of users at user workstations (UW) 603. In one embodiment, for example, one of the applications being supported by one or more primary hosts 601 may be an on-line banking service, or an Internet auction service. As input from the user workstations is received, corresponding data transactions may be initiated, which may result in updates to storage objects within primary data sets 102.

In one embodiment, a replicator 651 within the backup manager 130 may be configured to periodically replicate data from one or more of the primary hosts 601 to secondary host 625. The replicated backup version set 160A may include encodings 125 of extensibility records 109 (not shown in FIG. 6), generated using one or more of the techniques described above. In some embodiments, the replication operations for different primary data sets 102 may be scheduled and managed independently of each other. For example, primary host 601A may support a data mining application whose data sets do not change very often, and the primary data set 102A may be replicated once every six hours to a particular destination volume at secondary host 625. In the same example, primary host 601N may support an online transaction processing system such as an airline reservation system, whose data is updated fairly rapidly, and the primary data set 102N may be replicated once every ten minutes (or via continuous or real-time replication as described below) to the same destination volume or a different destination volume at secondary host 625. To maintain point-in-time copies of the primary application storage objects, a snapshot generator 653 may be configured to generate backup version sets 160B in the form of snapshots, e.g., once every hour, from the secondary host 625 to tertiary host 665. The snapshots may also include the encodings 125 in some embodiments, so that the extensibility records may be restored (along with the corresponding storage objects 105) from either secondary host 625 or tertiary host 665, as desired. The snapshot generator 653 and the replicator 651 may be configured to perform their respective operations asynchronously with respect to one another, i.e., according to independent schedules. Snapshots may be generated using any of a variety of specific techniques by snapshot generator 653, e.g., using operating system-provided snapshot functionality, volume-level mirroring, space efficient snapshot techniques, or custom hardware snapshot techniques.

In some embodiments, primary hosts 601 may include respective change monitors 605 (e.g., change monitor 605A at primary host 601A) that may be configured to monitor a specified set of storage objects of a corresponding primary data set 102 for changes. When changes such as creations, deletions, and modifications of storage objects or of extensibility records associated with storage objects are detected, the change monitor may be configured to inform the backup manager 130 (e.g., via a journaling mechanism), and a replicator 651 within the backup manager may be configured to replicate the changes at a secondary host 625, using extensibility record encoding techniques such as those describe above as needed. In some implementations, replicator 651 may be configurable to perform replication operations in either direction, as desired—e.g., from primary hosts to secondary hosts, or from secondary hosts to primary hosts, encoding extensibility records when replicating to secondary hosts, and decoding extensibility records when replicating from secondary hosts.

In one specific embodiment, a change monitor 605 may be configured to detect a variety of I/O operations (e.g., operations to read, write, or modify data, extensibility records and/or other attributes such as security or ownership attributes of files) performed on the set of primary storage objects, and to notify the backup manager 130 of the I/O operation detected as soon as, or very shortly after, it is detected. Replicator 651 may be configured to then replicate the I/O operation, or generate an encoding of an extensibility record, at secondary host 625. In this way, changes being made at primary hosts 601 may be very quickly reflected at the secondary host 625—e.g., the state of the backed up versions of primary storage objects at secondary host 625 may track the state of the primary data sets 102 to within a few seconds or even to within a few milliseconds in some implementations. Such a replication process, in which changes being made to the primary data set are detected and replicated in real time may be termed "continuous replication" or "real-time replication", and the backup manager 130 may be termed a "continuous protection server" in embodiments supporting continuous replication. Change monitors may also be implemented via file system filter drivers in some embodiments, which may be configured to intercept I/O operations as they are executed at the primary hosts 601. In one embodiment, change monitors may be configured to periodically check for changes to storage objects, instead of continuously monitoring for changes. In another embodiment, the replication process may include a synchronization of a primary data set 102 (e.g., a file system) with a replica at secondary host 625, with the additional capability of monitoring and replicating changes that occur at the primary data set after the synchronization begins—that is, both synchronization and continuous replication may be performed by backup manager 130. In some embodiments, backup and restoration operations may be managed in units called jobs.

Secondary host 625 may serve as a staging area for backed up data between the primary hosts 601 and tertiary hosts 665 in the embodiment of FIG. 6. In some embodiments, tape devices or optical storage devices such as various types of jukeboxes may be used for tertiary storage, while in other embodiments, the tertiary storage devices may include disks, disk arrays and the like. Backup manager 130 may include a restoration engine 654 in some embodiments, which may be configured to implement restoration operations from secondary host 625 or from tertiary host 665. In such an embodiment, restoration engine 654 may provide a restoration selection interface, e.g., to allow a user and/or administrator to search for and specify identify the storage objects that are to be restored as described above. In some implementations, the restoration selection interface may be a graphical user interface (GUI), while in other implementations, a command line or text-based interface may be used. In one implementation, a restoration selection interface may include a web page accessible via the Internet and/or an intranet. End users may be allowed to request restoration of storage objects using "user-friendly" names for the objects and/or using content-based search criteria, without, for example, specifying the exact logical paths or physical locations to the object to be restored or to the backup version from which restoration is desired.

Configuration information for backup operations, for example including locations of various versions of backed up objects, may be stored in backup configuration database 620 in one embodiment. In another embodiment, an administration server 657 may provide an interface such as an administrative console to configure and manage backup server 130 and its components, such as replicator 651 and snapshot generator 653. In one embodiment, in addition to backing up primary hosts 601, backup manager 130 may also be configured to back up data of one or more user workstations 603. In some implementations, any combination of replicator 651, snapshot generator 653 and restoration engine 654 may be implemented as independent modules or programs that may be invoked by backup manager 130 as needed.

Figure 7:
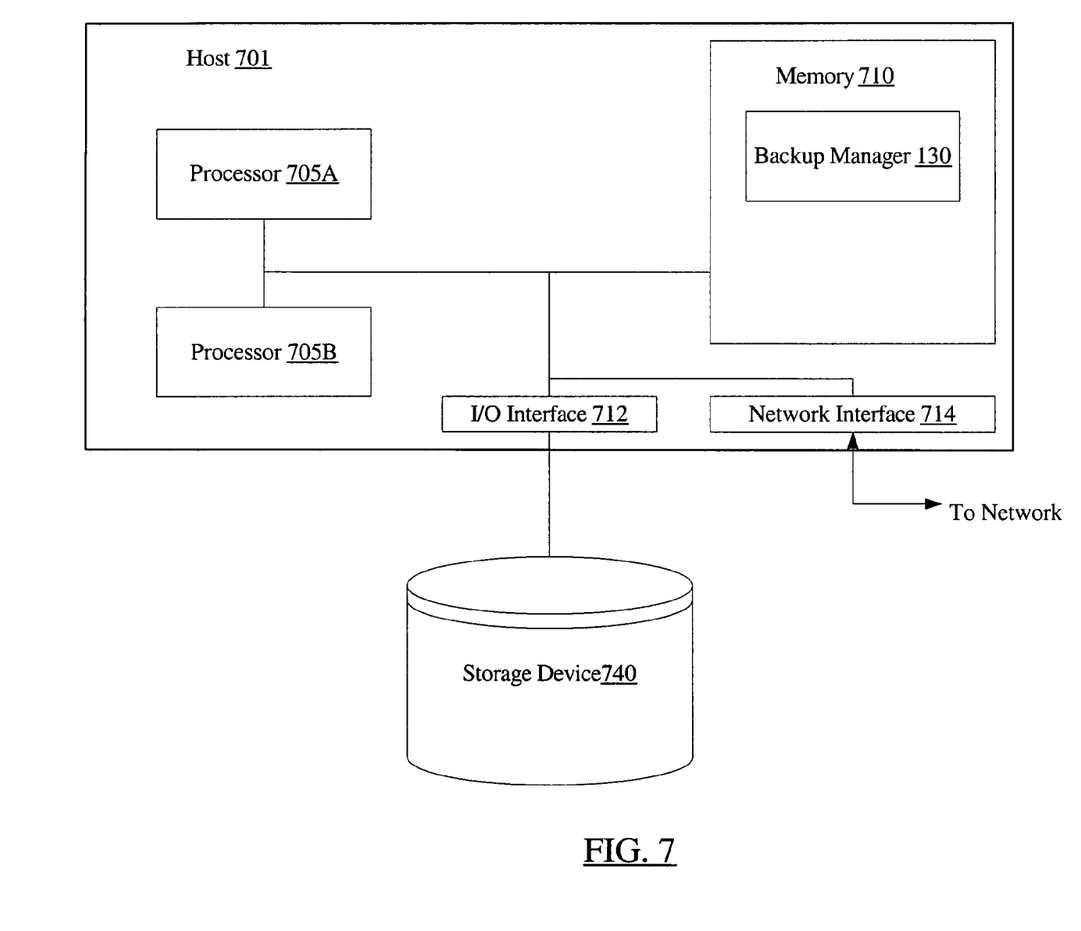
FIG. 7 is a block diagram illustrating constituent elements of a computer host, according to one embodiment.

In various embodiments, at least a portion of backup manager 130 may be executed at primary hosts 601, secondary hosts 625 or tertiary hosts 665. FIG. 7 is a block diagram of a computer host 701 that may be deployed as needed as a primary host 601, a secondary host 625, or a tertiary host 665, according to one embodiment. As shown, host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of backup manager 130 may be partly or fully resident within a memory 710 at a given point in time, and may also be stored on a storage device 740. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, interfaces to display devices (not shown), and the like. Any of a variety of storage devices 740 may be used to store the instructions as well as data for backup manager 130 and/or the contents of primary data sets 102 and backup version sets 160 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments.

In addition to backup manager 130, memory 710 and/or storage devices 740 may also store operating systems software and/or software for various applications such as backup configuration database 620, administration server 657, etc. in various embodiments. In some embodiments, portions or all of backup manager 130 may be included within an operating system, a storage management software product or another software package, while in other embodiments, backup manager 130 may be packaged as a standalone product. In one embodiment, one or more components of backup manager 130 described above, such as replicator 651, snapshot generator 653, and/or restoration manager 654 may be implemented as independent software packages or tools. In some embodiments, part or all of the functionality of backup manager 130 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use by a backup manager, the method comprising:
  initiating a backup procedure, and in response to initiating the backup procedure:
    identifying a storage object to be backed up, wherein the storage object is stored in a file system at a first host;
    generating a backup version of the storage object;
    determining whether the storage object has an associated extensibility record, wherein the extensibility record comprises a first reparse point including a first tag and a first data field, wherein the first tag indicates the first reparse point is of a first type which is for use by the file system at the first host;
    in response to determining that the storage object has an associated extensibility record:
      generating an encoded version of the first reparse point;
      generating a second reparse point including a second tag and a second data field, wherein the second reparse point is associated with the backup version of the storage object, and wherein the second tag indicates the second reparse point is of a second type which is for use by the backup manager, the second type being different from the first type;
      storing both the encoded version of the first reparse point and data from the first data field within the second data field of the second reparse point;
      storing the backup version of the storage object; and
      storing the second reparse point;
      restoring the storage object from the backup version, wherein said restoring comprises regenerating the extensibility record from the encoded version.

2. The method as recited in claim 1, wherein the encoded version comprises an alternate named stream of an object included within a file system.

3. The method as recited in claim 1, wherein the extensibility record includes an identification of an original location of at least a portion of the storage object.

4. The method as recited in claim 1, wherein the extensibility record includes configuration information associated with at least one of a volume mount point and a directory junction.

5. The method as recited in claim 1, wherein the extensibility record includes a pointer to a portion of the storage object stored within a second storage object.

6. The method as recited in claim 1, wherein the extensibility record is accessible via an invocation of a system call provided by an operating system.

7. A system, comprising:
  a processor; and
  memory coupled to the processor, wherein the memory stores program instructions computer-executable by the processor to implement a backup manager configured to:
    initiate a backup procedure, and in response to initiating the backup procedure:
      identify a storage object to be backed up, wherein the storage object is stored in a file system at a first host;
      generate a backup version of a storage object;
      determine whether the storage object has an associated extensibility record, wherein the extensibility record comprises a first reparse point including a first tag and a first data field, wherein the first tag indicates the first reparse point is of a first type which is for use by the file system at the first host;
      in response to determining that the storage object has an associated extensibility record:
        generate an encoded version of the first reparse point;
        generate a second reparse point including a second tag and a second data field, wherein the second reparse point is associated with the backup version of the storage object, and wherein the second tag indicates the second reparse point is of a second type which is for use by the backup manager, the second type being different from the first type; and
        store both the encoded version of the first reparse point and data from the first data field within the second data field of the second reparse point;
        store the backup version of the storage object; and
        store the second reparse point;
    wherein the backup manager is further configured to restore the storage object from the backup version, wherein said restoring comprises regenerating the extensibility record from the encoded version.

8. A computer readable storage medium comprising program instructions, wherein the instructions are computer-executable to implement a backup manager configured to:
  initiate a backup procedure, and in response to initiating the backup procedure:
    identify a storage object to be backed up, wherein the storage object is stored in a file system at a first host;
    generate a backup version of a storage object;
    determine whether the storage object has an associated extensibility record, wherein the extensibility record comprises a first reparse point including a first tag and a first data field, wherein the first tag indicates the first reparse point is of a first type which is for use by the file system at the first host; and
    in response to determining that the storage object has an associated extensibility record:
      generate an encoded version of the first reparse point;
      generate a second reparse point including a second tag and a second data field, wherein the second reparse point is associated with the backup version of the storage object, and wherein the second tag indicates the second reparse point is of a second type which is for use by the backup manager, the second type being different from the first type; and
      store both the encoded version of the first reparse point and data from the first data field within the second data field of the second reparse point;
      store the backup version of the storage object; and
      store the second reparse point;

wherein the backup manager is further configured to restore the storage object from the backup version, wherein said restoring comprises regenerating the extensibility record from the encoding.

9. The method as recited in claim 1, wherein the second reparse point is stored with the backup version of the storage object.

10. The system as recited in claim 7, wherein the second reparse point is stored with the backup version of the storage object.

11. The computer readable storage medium as recited in claim 8, wherein the second reparse point is stored with the backup version of the storage object.

* * * * *